United States Patent [19]

Bettinger

[11] Patent Number: 4,806,011
[45] Date of Patent: Feb. 21, 1989

[54] SPECTACLE-MOUNTED OCULAR DISPLAY APPARATUS

[76] Inventor: David S. Bettinger, 8030 Coventry, Grosse Ile, Mich. 48138

[21] Appl. No.: 69,854

[22] Filed: Jul. 6, 1987

[51] Int. Cl.⁴ .......................... G02C 7/14; G02C 1/00
[52] U.S. Cl. .................................... 351/158; 351/41; 351/50
[58] Field of Search ............... 351/41, 210, 158, 50; 350/174

[56] References Cited

U.S. PATENT DOCUMENTS

| 4,034,401 | 7/1977 | Mann | 351/210 X |
| 4,145,122 | 3/1979 | Rinard et al. | 351/158 |
| 4,702,575 | 10/1987 | Breglia | 351/210 |

*Primary Examiner*—Rodney B. Bovernick
*Attorney, Agent, or Firm*—Barnes, Kisselle, Raisch, Choate, Whittemore & Hulbert

[57] ABSTRACT

Spectacle-mounted display apparatus in which a reflective surface of a partially-transparent eyeglass lens is employed as the primary optical element. A concave spherical relay reflector is positioned inside the lens/eye cavity. The display ocular is an asymmetrical multi-axial virtual image magnifier which receives the object light on its relay reflector and thereby reflects the object light from the partially reflective surface of the spectacle lens to the wearer's eye to form a virtual image at infinity. In various embodiments of the invention, the ocular display apparatus is employed as a personal display of film, LEDs, fiber optics, CRT or electronic images generated for delivering data to a wearer as a virtual image at infinity.

13 Claims, 2 Drawing Sheets

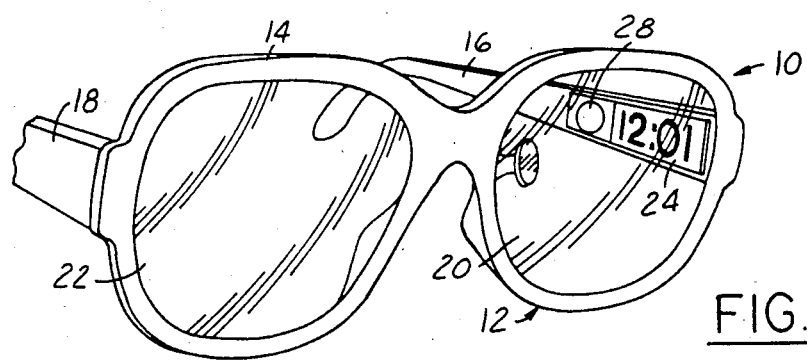
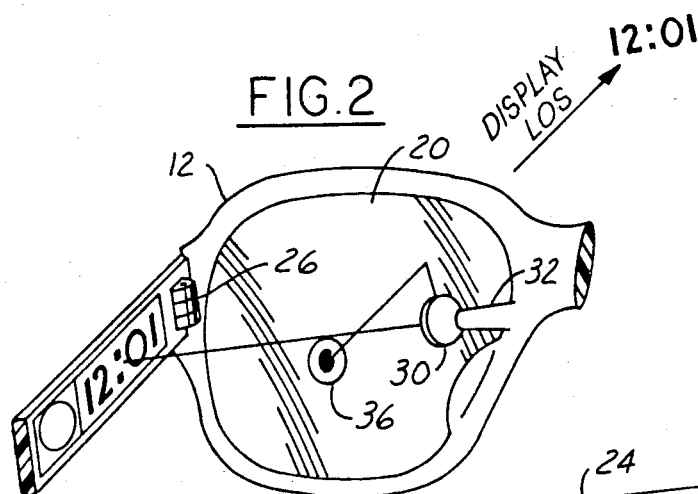
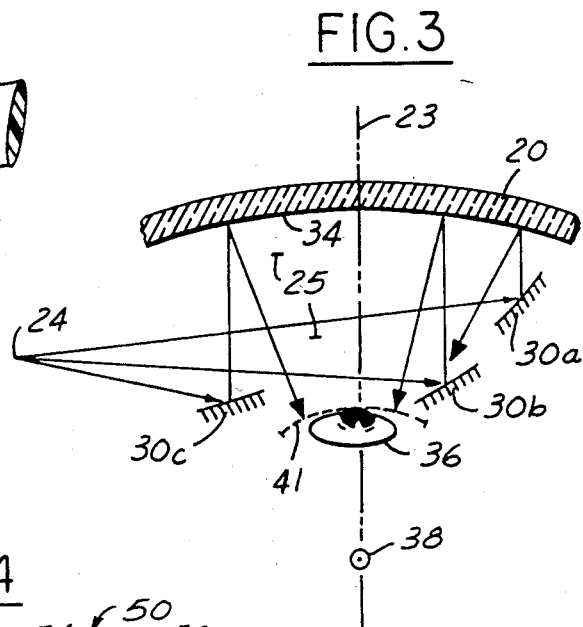
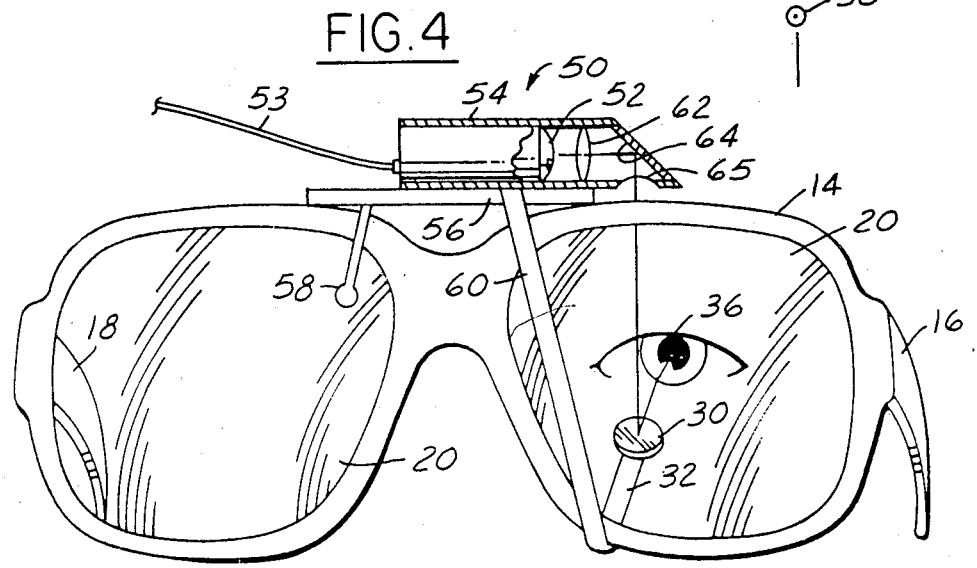
FIG.1
FIG.2
FIG.3
FIG.4

SPECTACLE-MOUNTED OCULAR DISPLAY APPARATUS

The present invention is directed to apparatus for mounting on spectacles for personal display of optical information using a concave surface of a spectacle lens as a primary reflector.

The present invention is in the field of optical eyepieces consisting of mirrors on two or more axes, the primary mirror being concave. Such eyepieces may be used in both telescopic and microscopic applications. Although the present invention comprises a true universal ocular having application to both telescopes and microscopes, a basic object of the invention is to provide a portable lightweight inexpensive personal optical system for selective micro-viewing and micro-display of optical information. The invention employs the spherical qualities of a conventional eyeglass lens as a primary reflector or mirror. Bouwers, *Achievements in Optics*, Elsevier Pub. Co., New York (1946) used commercial spectacle lenses to construct a double-reflecting camera with a relative aperture of approximately f/1.0. A low power microscope was also proposed by Bouwers in which a refractive objective lens was employed to correct for coma and spherical aberration in an ocular which included a spherical mirror. A flat relay mirror which received the image from the objective lens had a central viewing opening.

Displays have been developed for helmet-mounted aircraft guidance and weapon aiming applications. U.S. Pat. No. 3,697,154 discloses a double-reflective CRT viewer with a working distance of about three feet. More recent displays employ the interior surface of a partially reflective parabolic visor mounted on a helmet. U.S. Pat. No. 3,833,300 proposes fiber optics to relay mini-CRT output by visor reflectance for a weapon sighting system. U.S. Pat. No. 4,081,209 proposes a complex prism arrangement positioned forward and above the helmet-wearer's forehead. U.S. Pat. No. 4,220,400 proposes a helmet visor that incorporates a fresnel lens. U.S. Pat. No. 4,361,384 discloses optical means for intensifying the visor-reflected image. Helmet displays of the character described above are typically bulky, heavy and therefore not suitable for continuous use. Helmets also interfere with inter-personal communications. Furthermore, helmets heretofore proposed in the art do not incorporate vision correction.

It is a further object of the present invention to provide presentation at infinite focus of visual information derived remotely of the viewer's eye in such a manner that the viewer's perception of the normal field of vision is not deleteriously affected. Another object of the invention is to provide an apparatus of the described character of such size and weight as to be adapted for continuous wearing during normal activity.

Stability is an important goal of microscope design. The current method of achieving a stable platform is by use of heavy components. This has resulted in slides that may weigh 1000 times the specimen, and microscope structures that weigh 1000 times the specimen slide. It is another important object of this invention to provide a stable micro-viewing apparatus for film, microfilm, slides or other micro-sized transparent display means which employs spectacles of conventional construction as a platform for all system elements. The eye, specimen, optics and illumination system thus share a common support—i.e., the wearer's head and face.

U.S. Pat. No. 3,936,605 discloses a speech cueing system in which a multi-segment mirror is mounted on the concave internal surface of a spectacle lens. Precision manufacture and assembly are required. Spectacle-mounted binocular television is proposed in U.S. Pat. No. 2,388,170, but has not become a practical product due in part to precision and complexity of the required optics.

The invention, together with additional objects, features and advantages thereof, will be best understood from the following description, the appended claims and the accompanying drawings in which:

FIG. 1 is a fragmentary perspective view of spectacles embodying ocular display apparatus in accordance with one embodiment of the invention;

FIG. 2 is a fragmentary internal perspective view of the spectacles of FIG. 1 illustrating the display in operation;

FIG. 3 is a schematic diagram useful in explaining theory and operation of the invention;

FIGS. 4 and 5 are fragmentary perspective views of respective modified embodiments of the invention.

Figure 5:
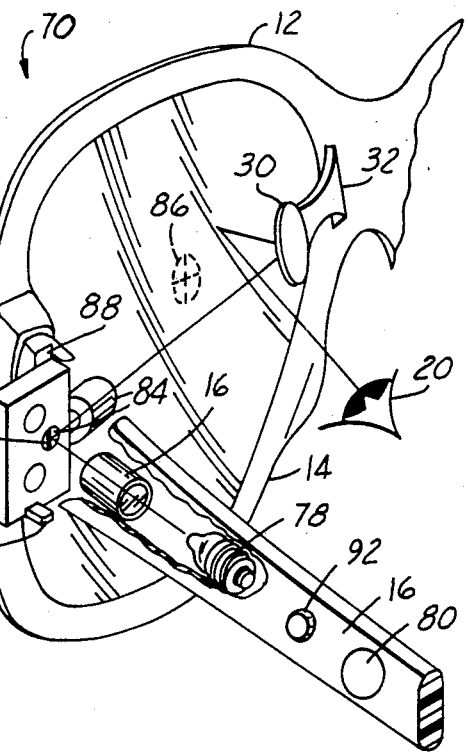

FIGS. 1-2 illustrate a basic embodiment 10 of ocular display apparatus in accordance with the invention as comprising a pair of spectacles 12 including a frame 14 having a pair of laterally spaced temples 16,18 and a pair of lenses 20,22. Spectacles 12 to the extent thus far described are of conventional construction, with lenses 20,22 being either of suitable prescription or of non-corrective construction. Frame 14 including temples 16,18 are constructed and sized for mounting on the head of an individual wearer as is conventional, with the lenses being spaced from the wearer's eyes along a central axis 23 (FIG. 3) and defining an open lens/eye cavity 25 therebetween. An LED or LCD clock 24 is mounted internally of temple 16 at the forward end thereof adjacent to the temple hinge 26 (FIG. 2) and is powered by the battery 28 for continuously or selectively optically radiating its image into cavity 25 between lens 20 and the wearer'eye from a direction generally orthogonal to central axis 23. A reflector 30 is carried by an arm 32 affixed to frame 12 and projects into lens/eye cavity 25 at a position to intercept light energy radiated by clock 24 and to reflect such energy onto the internal surface 34 (FIG. 3) of lens 20. Such energy is reflected by surface 34, which preferably carries a partially transparent film of reflective metallic construction, onto the wearer's eye 36.

Conventional spectacles require a spherical concave inner surface 34 to compensate for movement of the wearer's eye 36. By use of such a meniscus lens, the eye experiences approximately the same correction on any axis of view. Spherical reflective surface 34 has a focal point 38 (FIG. 3). For the average adult, the required focal length of surface 34 may be about 35 mm, and the distance of the lens surface to the pupil may average about 20 mm for eyelash clearance. In order to employ lens surface 34 as a primary reflector in accordance with the present invention while maintaining conventional lens/eye spacing, reflector 30 preferably comprises a concave spherical relay mirror. The working distance of the display is equal to the product of the focal lengths of reflectors 30,34 divided by their sum minus the distance between the reflecting surfaces. For example, if the distance between reflectors 30,34 is 15 mm, the focal length of reflector 30 would be 26.67 mm to effectively collimate the rays from clock 24 into the eye pupil and thereby provide a virtual image 40 (FIG. 2) at infinity along a display line of sight (LOS) 42 above and to the right of central axis 23. Persons with large eyeballs may require that relay mirror 30 be essentially planar or flat.

FIG. 3 illustrates placement of relay reflector 30 at three different positions 30a, 30b and 30c. Light rays in each case are relayed to the primary reflecting surface 34 and thence toward focus 38. Because of the movement of eye 36, the images are intercepted by the pupil at differing points on its locus of movement 41. Thus, the working distances of rays reflected at 30a, 30b, 30c would require differing relay reflectors with differing degrees of curvature properly to collimate the image. It will be appreciated that at each position reflector 30 is small in relation to primary reflecting surface 34. Because the image is received on relay reflector 30, its size limits the field of view to one nominal degree of field for every millimeter of relay lens diameter. Thus, a 10 mm relay reflector render a field of view approximately equal to the apparent width of a column of newsprint at normal reading distance or the width of a 21 inch television screen at a 7.5 foot viewing distance. Most preferably, arm 32 may be adjusted by the wearer or by a technician for proper placement of the virtual image at infinity.

FIG. 4 illustrates a clip-on display 50 incorporating an electronic image generator, in this case a CRT 52 electronically driven by suitable means (not shown) through the conductors 53. CRT 52 and associated optics are carried within a housing 54 on a platform 56 which is fastened by spring clips 58 to spectacles frame 14 adjacent to the wearer's forehead. A bracket 60 extends downwardly from platform 56 and serves not only to fasten display 50 on spectacles frame 12 but also to support the relay reflector 30 within the cavity between lens 20 and eye 36. The image of the CRT screen is transmitted through a lens system 62 onto a plane relay reflecting surface 64 within housing 54 downwardly through the housing aperture 65 onto reflector 30, and thence onto the inside surface of lens 20 to the wearer's eye. The embodiment of FIG. 4 thus displays a virtual image of the CRT screen at infinity that is perceived as being right of center and below the normal line of sight by about twenty degrees, for example. As a modification to the embodiment of FIG. 4, the image from a remote CRT may be brought to focusing optic 62 by means of a fiber optic cable or the like.

An embodiment 70 of the invention for microfilm or micro-photo viewing is shown in FIG. 5. Temple 16 of frame 12 removably supports a microfilm cassette 72. An objective lens 74, a condenser lens assembly 76 and an illumination lamp 78 powered by a battery 80 are carried by temple 16. Light from lamp 78 transmitted through condenser lens assembly 76 is reflected by the relay mirror 82, which may be either built into cassette 72 or supported by temple 16. Light reflected by mirror 82 passes through film 84 onto relay reflector 30, and thence onto lens 20 and to the wearer's eye. The embodiment as depicted displays a virtual image at infinity on a line of sight that is perceived as being about fifteen degrees above and to the right of visual center 86. Cassette 72 is removably retained on temple 16 by the spring clip 88. Film can be advanced or returned manually by the lever 90. Focus is accomplished by adjustment of objective lens 74. Illumination intensity is controlled by the intensity control knob 92.

Figure 6:
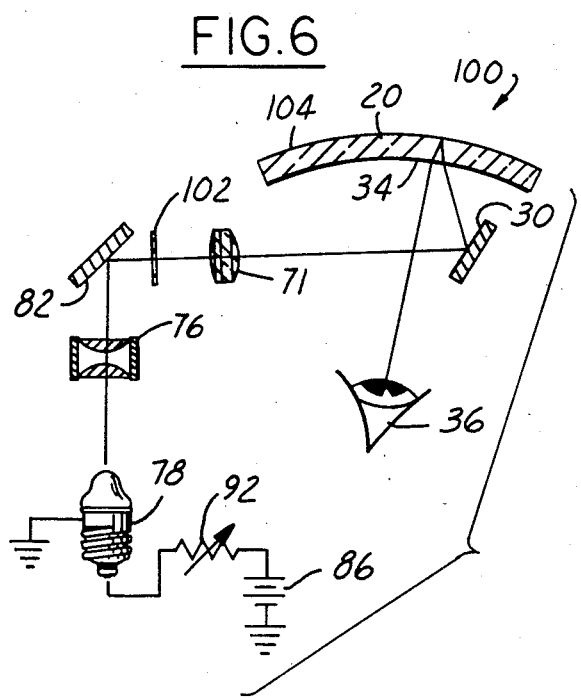
FIG. 6 is a schematic diagram of a further embodiment of the invention.

FIG. 6 schematically illustrates a modification 100 to the embodiment of FIG. 5 which incorporates a microfilm viewer or a low-power microscope. The low voltage lamp 78 carried by the spectacles temple produces light that passes through condenser lens assembly 76 and is reflected by plane mirror 82 through the film or slide 102. The image is magnified and projected by achromatic objective lens 74 onto reflector 30. In the embodiment of FIG. 6, the outer surface 104 rather than the inner surface 34 of lens 20 carries the partially reflective metallic film, so that light from reflector 30 is intercepted by the inside surface of lens 20, refracted internally, reflected by partially reflective outer surface 104, refracted again, and transmitted to wearer's eye 36. The advantage of this path over reflection from the inside eyeglass surface 34 as in the previous embodiments lies in placement of the virtual image closer to central axis 23 (FIG. 3) without moving reflector 30 further into the lens/eye cavity.

It will be appreciated that the principles of the ocular display apparatus hereinabove disclosed find numerous applications in addition to the various embodiments illustrated in the drawings. For example, the ocular display apparatus of the invention may be employed as a personal micro-display incorporating LEDs, LCDs or fiber optics for a sensory enhancement display such as for speech cueing, a monitor of time, temperature or body function, a remote monitor of equipment or vehicles, or a cueing display for group management and training sessions or for entertainment. The display of the invention finds ready application employing small CRTs or video microchips for an aircraft guidance, sighting or simulation display, an instrumentation monitor, a television monitor or a computer data monitor. Likewise, the invention may be employed for projecting a virtual scaler image for measurement of distance, dimension or angle.

The invention claimed is:
1. Ocular display apparatus comprising:
spectacles including a frame for mounting on a wearer's head and at least one lens carried by said frame for positioning in spaced alignment with a wearer's eye on a central axis for defining a cavity between said lens and the wearer's eye said central axis generally corresponding to a wearer's natural forward line of sight, said lens having at least one surface which is concave with respect to said cavity and being of partially reflective construction,
means for radiating an optical image in the form of an objective image into said cavity from a direction generally orthogonal to said central axis, and
a relay mirror positioned within said cavity for intercepting and reflecting said visible objective image onto said lens surface, and being reflected by said lens surface to a wearer's eye to form a virtual image of said radiating means of infinity.

2. The apparatus set forth in claim 1 wherein said relay mirror comprises a concave spherical reflector.

3. The apparatus set forth in claim 2 wherein said lens surface comprises a second concave spherical reflector having a predetermined focal length, and wherein said relay mirror has a focal length coordinated with said predetermined focal length and spacing between said lens surface and said relay mirror for substantially collimating light energy reflected by said lens surface toward a wearer's eye.

4. The apparatus set forth in claim 1 wherein said radiating means comprises means carried by said frame.

5. The apparatus set forth in claim 4 wherein said frame includes a pair of spaced temples and wherein said radiating means is carried by one of said temples.

6. The apparatus set forth in claim 5 wherein said radiating means comprises means for removably mounting a translucent display on said one temple, and means for directing light energy through said display onto said relay mirror within said cavity.

7. The apparatus set forth in claim 6 wherein said radiating means comprises a light source and a condensing lens carried by said one temple.

8. The apparatus set forth in claim 7 wherein said display means comprises film display means including means for removably mounting film on said one temple.

9. The apparatus set forth in claim 7 wherein said display means comprises a microscope including means for removably mounting a specimen slide on said one temple.

10. The apparatus set forth in claim 5 wherein said radiating means comprises a clock carried by said one temple.

11. The apparatus set forth in claim 4 wherein said radiating means comprises means for projecting a screen display object image onto said relay mirror.

12. The apparatus set forth in claim 4 wherein said radiating means is carried by a bracket constructed for removable mounting to said frame, said relay mirror being carried by an arm of said bracket for disposition within said cavity.

13. The apparatus set forth in claim 1 further comprising a partially transparent metallic film on said one lens surface.

* * * * *